(12) United States Patent
Wienke et al.

(10) Patent No.: US 9,757,927 B2
(45) Date of Patent: Sep. 12, 2017

(54) FLEXIBLE SHEET, METHOD OF MANUFACTURING SAID SHEET AND APPLICATIONS THEREOF

(75) Inventors: Dietrich Wienke, Elsloo (NL); Roelof Marissen, Born (NL); Martinus Johannes Nicolaas Jacobs, Heerlen (NL); Wilheimus Gerardus Marie Bruls, Geulle (NL); Francois Antoine Marie Op Den Buijsch, Voerendaal (NL); Leonardus Jacobus Johannus Welzen, Urmond (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 13/394,826

(22) PCT Filed: Oct. 12, 2010

(86) PCT No.: PCT/EP2010/065286
§ 371 (c)(1),
(2), (4) Date: Jun. 30, 2012

(87) PCT Pub. No.: WO2011/045321
PCT Pub. Date: Apr. 21, 2011

(65) Prior Publication Data
US 2012/0264343 A1 Oct. 18, 2012

(30) Foreign Application Priority Data
Oct. 12, 2009 (EP) .................................. 09172806

(51) Int. Cl.
*D03D 1/00* (2006.01)
*B32B 27/12* (2006.01)
*B32B 5/02* (2006.01)
*B32B 27/20* (2006.01)
*B32B 27/32* (2006.01)
(Continued)

(52) U.S. Cl.
CPC .............. *B32B 27/12* (2013.01); *B32B 5/024* (2013.01); *B32B 25/10* (2013.01); *B32B 25/14* (2013.01);
(Continued)

(58) Field of Classification Search
CPC .... B32B 2262/0215; B32B 2262/0253; B32B 27/32; B32B 5/024; D06N 3/0002; D06N 3/045
USPC ................................ 442/189, 203, 204, 290
See application file for complete search history.

(56) References Cited

U.S. PATENT DOCUMENTS 3,551,231 A 12/1970 Smedberg
5,759,462 A 6/1998 Jordan
(Continued)

FOREIGN PATENT DOCUMENTS

| | | |
|---|---|---|
| CN | 101100889 | 1/2008 |
| JP | 11-138715 | 5/1999 |

(Continued)

OTHER PUBLICATIONS

Derwent abstract of JP2001303426.*
(Continued)

*Primary Examiner* — Vincent A Tatesure
(74) *Attorney, Agent, or Firm* — Nixon & Vanderhye P.C.

(57) ABSTRACT

The invention relates to a flexible sheet comprising (i) a woven fabric comprising yarns containing polyethylene fibers; and (ii) a plastomer layer adhered to at least one surface of said woven fabric wherein said plastomer is a semi-crystalline copolymer of ethylene or propylene and one or more C2 to C12 α-olefin co-monomers and wherein said plastomer having a density as measured according to ISO1183 of between 870 and 930 kg/m3, wherein the flexible sheet has a shrinkage of at most 1.9%.

15 Claims, 2 Drawing Sheets

(51) Int. Cl.
  *D06N 3/00* (2006.01)
  *D06N 3/04* (2006.01)
  *B32B 25/10* (2006.01)
  *B32B 25/14* (2006.01)

(52) U.S. Cl.
  CPC .............. *B32B 27/20* (2013.01); *B32B 27/32* (2013.01); *B32B 27/327* (2013.01); *D06N 3/0002* (2013.01); *D06N 3/045* (2013.01); B32B 2260/021 (2013.01); B32B 2260/046 (2013.01); B32B 2260/048 (2013.01); B32B 2262/0215 (2013.01); B32B 2262/0253 (2013.01); B32B 2307/308 (2013.01); B32B 2307/546 (2013.01); B32B 2307/72 (2013.01); B32B 2307/734 (2013.01); B32B 2419/00 (2013.01); B32B 2419/06 (2013.01); B32B 2439/06 (2013.01); B32B 2439/46 (2013.01); B32B 2553/00 (2013.01); Y10T 442/3065 (2015.04); Y10T 442/3179 (2015.04); Y10T 442/3187 (2015.04); Y10T 442/3886 (2015.04)

(56) References Cited

U.S. PATENT DOCUMENTS

| | | | |
|---|---|---|---|
| 5,773,373 A | 6/1998 | Wynne et al. | |
| 5,994,242 A | 11/1999 | Arthurs | |
| 6,054,178 A | 4/2000 | Howells | |
| 6,280,546 B1 | 8/2001 | Holland et al. | |
| 7,132,376 B2* | 11/2006 | Rashed | B32B 5/26 139/383 R |
| 2003/0211280 A1 | 11/2003 | Brumbelow et al. | |
| 2004/0058152 A1 | 3/2004 | Tokarsky | |
| 2004/0166752 A1 | 8/2004 | Taghavi | |
| 2005/0093200 A1* | 5/2005 | Tam et al. | 264/211.14 |
| 2005/0170724 A1 | 8/2005 | Ki | |
| 2006/0134388 A1 | 6/2006 | Miller et al. | |
| 2007/0137064 A1* | 6/2007 | Tam | D02J 1/22 34/523 |
| 2008/0274307 A1 | 11/2008 | Chereau et al. | |

FOREIGN PATENT DOCUMENTS

| | | |
|---|---|---|
| JP | 11-291419 | 10/1999 |
| JP | 2000-233477 | 8/2000 |
| JP | 2001303426 A * | 10/2001 |
| WO | WO 2006/109319 | 10/2006 |

OTHER PUBLICATIONS

Machine translation of JP2001303426.*
International Search Report for PCT/EP2010/065286, mailed Feb. 8, 2011.

* cited by examiner

FLEXIBLE SHEET, METHOD OF MANUFACTURING SAID SHEET AND APPLICATIONS THEREOF

This application is the U.S. national phase of International Application No. PCT/EP2010/065286 filed 12 Oct. 2010 which designated the U.S. and claims priority to EP Priority Application No. 09172806.3 filed 12 Oct. 2009, the entire contents of each of which are hereby incorporated by reference.

The invention relates to a flexible sheet suitable for use in a variety of applications such as covers for cargo and containers, ground covers, roofing, curtains, tarpaulins and building covers and to a manufacturing method of said sheet. The invention also relates to various products containing the flexible sheet.

Numerous flexible sheets suitably used in the above mentioned applications are described in literature and are known in practice. The known sheets usually include a fabric for reinforcement, said fabric being encapsulated between sheets of thermoplastic material adhered thereto. Woven or non-woven fabrics made of high-strength and low shrinkage fibers, e.g. fibers of polyester, nylon, aramid or glass were used for reinforcement, while a plethora of polymers was utilized for the sheets of thermoplastic material. Among the most used polymers are elastomers such as thermoplastic polyolefins, ethylene-propylene rubber (EPM), ethylene-propylene-diene rubber (EPDM); thermoplastic urethanes and polyvinyl chloride polymers. Examples of embodiments of known flexible sheets using the above mentioned materials are disclosed for instance in U.S. Pat. Nos. 5,773,373; 6,864,195 and 6,054,178.

A flexible sheet comprising a polyethylene fabric for reinforcement said fabric being laminated with a low density polyethylene (LDPE) layer or an ethylene vinyl acetate (EVA) layer is also disclosed U.S. Pat. No. 6,280,546.

Japanese publications JP 11 138715; JP 11 291419 and JP 2000 233477 also describe a flexible sheet comprising a layer of an ethylene copolymer having alpha-olefin comonomers with at least three carbon atoms, said layer being laminated on a fabric woven from polyolefin fibers. U.S. Pat. No. 5,994,242 discloses a coated woven material having improved lightweight, cold temperature flexibility and abrasion resistance, wherein said coated woven material comprises a woven scrim and a coating on at least one side of said scrim, the coating comprising a blend of 20-100 wt % of an elastomeric copolymer of ethylene and at least one hydrocarbon alpha-olefin comonomer of at least 4 carbon atoms.

The known flexible sheets show enhanced tear resistance; good characteristics for outdoors usage and handling; abrasion resistance; excellent chemical and fire resistance and some of them are even recyclable. Furthermore, due to the use of dimensionally stabile fibers e.g. polyester, nylon, aramid or glass, most of the known flexible sheets made thereof show a good dimensional stability, e.g. low shrinkage. However known flexible sheets containing polyester, nylon, aramid or glass fibers are either too weak or too heavy.

It is known that polyethylene fibers and yarns containing polyethylene fibers show an excellent weight to strength ratio. Polyethylene fabrics, i.e. fabrics made of yarns containing polyethylene fibers, have also the advantage of being lightweight and stronger than any fabric manufactured from e.g. polyester, nylon, aramid or glass fibers.

It was however noticed by the present inventors that the manufacturers of flexible sheets systematically avoided the utilization of polyethylene fabrics for reinforcement, especially when dimensional stability is a must. The reason thereof is that all attempts failed when trying to construct a dimensionally stable flexible sheet including such a polyethylene fabric. It was observed that none of the flexible sheets reinforced with polyethylene fabrics, such as those described in JP 11 138715; JP 11 291419; JP 2000 233477 and US 5,994,242 had an acceptable dimensional stability, e.g. a low degree of shrinkage, in particular when used in long term applications. Also the flexible sheet of U.S. Pat. No. 6,280,546 presented an increased shrinkage during utilization and was therefore also unsuitable for long term applications.

It is long known that polyethylene fibers have a low compressive yield strength and that such fibers may be affected during their utilization by the formation of so-called kink bands. Without being bound by any explanation, the present inventors believe that the formation of kink-bands may lead to a shrinkage of the fibers and hence to a shrinkage of the products containing thereof. Therefore, the advantageous properties of polyethylene fibers, e.g. lightweight, chemical resistance and high strength, could not be utilized to their full extent in flexible sheets designed in particular for applications where dimensional stability is required.

It is therefore an aim of the present invention to improve the known flexible sheets comprising a polyethylene fabric for reinforcement e.g. by reducing the shrinkage of said sheets during their utilization.

A flexible sheet has been developed, said sheet comprising:
 (i) a woven fabric having a warp direction and a weft direction and comprising yarns containing polyethylene fibers;
 (ii) a plastomer layer adhered to at least one surface of said woven fabric wherein said plastomer is a semi-crystalline copolymer of ethylene or propylene and one or more C2 to C12 α-olefin co-monomers and wherein said plastomer has a density as measured according to ISO1183 of between 870 and 930 kg/m$^3$;
and wherein the flexible sheet has a total shrinkage of at most 1.9%.

Preferably, the flexible sheet of the invention has a total shrinkage of at most 1.8%, more preferably of at most 1.7%, most preferably of at most 1.6%. By total shrinkage is herein understood the average shrinkage in the warp and the weft directions of the woven fabric.

In a preferred embodiment, the flexible sheet of the invention has a total shrinkage of less than 1.5%, more preferably of less than 1.2%, even more preferably of less than 1.0%, yet even more preferably of less than 0.8%, yet even more preferably of less than 0.6%, most preferably of less than 0.45%. The total shrinkage may be determined by measurements carried out according to the methodology disclosed hereinafter in the "METHODS OF MEASUREMENT" section of the present document. Preferably, the flexible sheet of the invention has a shrinkage in the warp direction of less than 1%, more preferably of less than 0.6% most preferably of less than 0.5%. Preferably, the flexible sheet of the invention has a shrinkage in the weft direction of less than 1%, more preferably of less than 0.5%.

It was noticed by the present inventors that the various properties of the polyethylene fibers were harnessed more efficiently than hitherto when manufacturing flexible sheets, in that the flexible sheet of the invention has improved properties over known sheets. In particular it was observed that the flexible sheet of the invention has good dimensional stability. More in particular it was observed that the flexible sheet of the invention shows a proper resistance to shrinkage during its utilization especially in long term applications. It was also observed the said sheet is lightweight, has a good tear resistance and a high strength to break. It was furthermore observed that during its utilization in cold environments, the flexible sheet of the invention is affected to a low extent by low temperature induced damage, e.g. cracks and the like.

By adhered is herein understood that the plastomer grips at least by physical forces to the polyethylene fibers with which it comes into contact. It is however not essential for the invention that the plastomer actually chemically bonds to the surface of the fibers. It was observed that the plastomer used according to the invention has an effective grip on the polyethylene fibers even in the absence of chemical bonds, as compared with other types of thermoplastic materials. In a preferred embodiment the surface of the polyethylene fibers is corrugated, have protrusions or hollows or other irregular surface configurations in order to improve the grip between the plastomer and the fiber.

Preferably, the flexible sheet of the invention comprises:
(i) a woven fabric comprising yarns containing polyethylene fibers;
(ii) a plastomer layer comprising a first part adhered to one surface of said woven fabric and a second part impregnated between the yarns and/or the fibers of said fabric, wherein said plastomer is as defined hereinabove.

Preferably, the second part extends throughout said fabric and is preferably being cohesively connected to said first part.

It was further noticed that yet a better shrinkage resistance for the flexible sheet of the invention was obtained when the plastomer layer adheres to both surfaces of the woven fabric encapsulating said fabric. Therefore, in a preferred embodiment of the invention, the flexible sheet comprises:
(i) a woven fabric having an upper surface and a lower surface and comprising yarns containing polyethylene fibers;
(ii) a plastomer layer encapsulating said fabric, wherein the plastomer is as defined hereinabove.

Preferably, the plastomer layer encapsulating said fabric comprises a first part adhered to said upper surface; a third part adhered to said lower surface; and a second part which is impregnated between the yarns and/or the fibers of said fabric and extends throughout said woven fabric.

In a further preferred embodiment of the invention, the flexible sheet comprises:
(i) a woven fabric having an upper surface and a lower surface and comprising yarns containing polyethylene fibers;
(ii) a plastomer layer preferably encapsulating said fabric, wherein the plastomer is as defined hereinabove; and wherein the plastomer layer comprises a first part adhered to said upper surface; a third part adhered to said lower surface; and a second part which is impregnated between the yarns and/or the fibers of said fabric and extends throughout said woven fabric; and wherein said second part is cohesively connected to said first and third part of said plastomer layer.

By two cohesively connected parts of the plastomer layer is herein understood that said parts are fused together into a single body such that preferably no line of demarcation is formed therebetween as can be determined e.g. by optical microscopy and preferably no variation of mechanical or physical properties occurs throughout the plastomer layer. It also goes without saying that the terms "upper surface" and "lower surface" are merely used to identify the two surfaces which are characteristic to a woven fabric and should not be interpreted as actually limiting the woven fabric to facing a certain up or down positioning.

The flexible sheet of the invention is considered flexible when by placing on the edge of a table a square sample of the sheet, part of the length of said samples being in contact with and supported by the table and the remaining length extending freely over a distance L=200×(thickness of the sheet) from the edge of said table, said remaining length deflects by at least $0.1 \times L$ below the level of the table. Flexible sheets having different flexibilities may be obtained by choosing an appropriate combination of fabric weave, amount of plastomer and degree of impregnation.

According to several embodiments of the flexible sheet of the invention, the plastomer layer comprises a first part and a second part which is impregnated into the woven fabric between the yarns and/or the fibers thereof. Preferably said second part is impregnated between both the yarns and the fibers. Preferably, the second part of the plastomer layer also extends throughout said fabric, meaning that the plastomer material forming said second part is distributed along the lateral dimensions of the fabric as well as along the vertical dimension of the fabric between the surfaces thereof. Preferably, the impregnation is carried out such that said second part of the plastomer layer extends along the vertical dimension from one surface of the fabric all the way to the opposite surface thereof.

In a preferred embodiment of the invention, the flexible sheet essentially consists of the woven fabric, e.g. according to any one of the bullets (i) above; the plastomer layer, e.g. according to any one of the bullets (ii) above and optionally various fillers and additives as defined hereinafter added to the plastomer. It was observed that a flexible sheet in accordance with this embodiment shows a reduced shrinkage while being strong and lightweight. Moreover, said sheet is easily sealed along a seam by heat welding, which provides a strong seal and results in overall time and cost savings.

The present invention will be described more in detail with the help of several preferred embodiments and illustrated merely by way of example and not with the intent to limit the scope thereof in the accompanying drawings.

Figure 1:
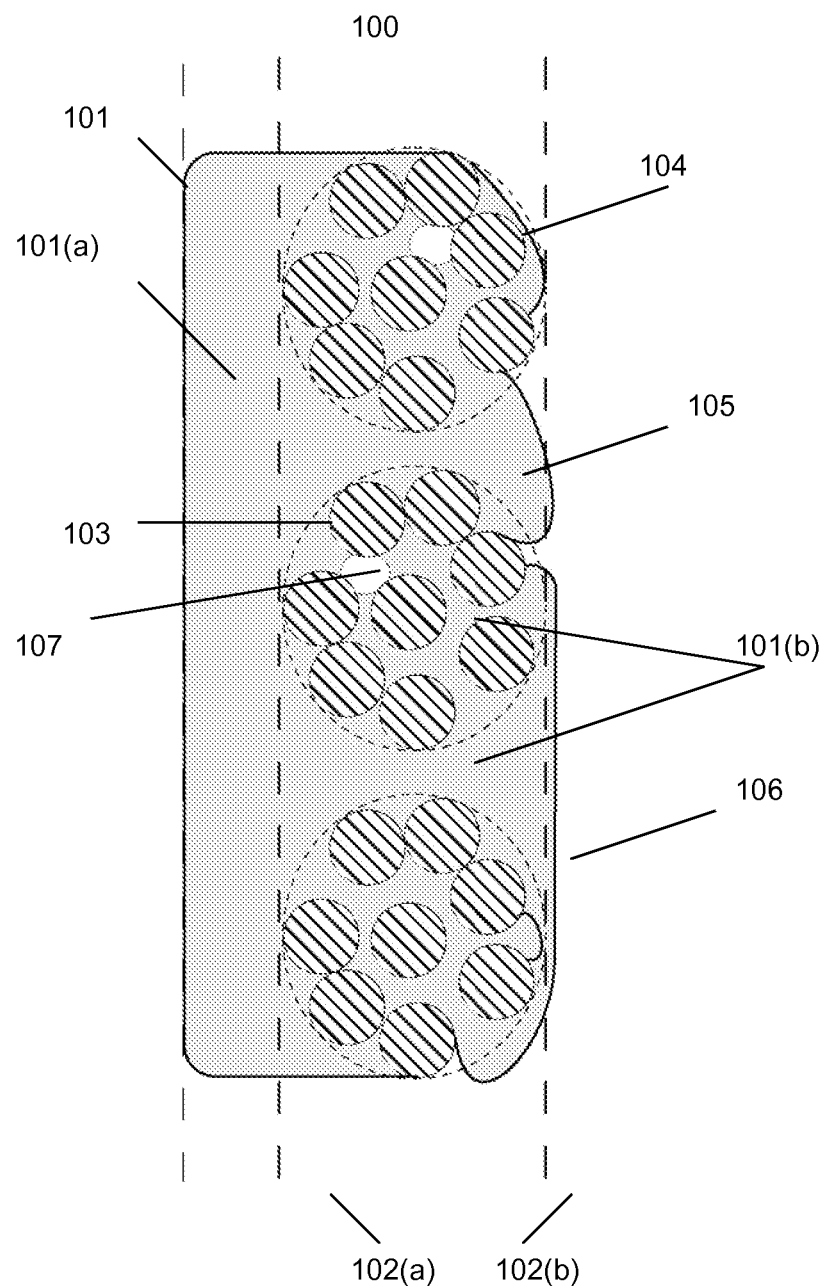
FIG. 1 is a cross-sectional view of a flexible sheet comprising a woven fabric and a plastomer layer adhered to a surface thereof and impregnated into the fabric.

Referring to FIG. 1, the flexible sheet (100) contains a plastomer layer (101) having a second part (101b) impregnated into the woven fabric between the yarns (103) and the fibers (104) thereof and extending throughout the fabric all the way between the upper (102a) and lower (102b) surface thereof. Said second part is cohesively connected to a first part (101a) of the plastomer layer (101) adhered to and covering the surface (102a) of the fabric. Woven fabrics generally contain at least two sets of yarns, usually called warp yarns and weft yarns that are interlaced and lie at an angle to each other. For simplicity, only one such set, e.g. the warp yarns (103) containing fibers (104) is shown in FIG. 1.

In a preferred embodiment of the flexible sheet according to the invention, said second part (101b) extend beyond the surface level (102b) of the woven fabric that is opposite to the surface (102a) covered by the first part (101a) of the plastomer layer (101) for example to create excrescences (105) of plastomer. More preferably said second part extends beyond said surface level (102b) such that said excrescences coalesce with each other to form a film-like plastomer layer (106) adhered to the surface (102b) of the woven fabric. Preferably, the film-like plastomer layer has a thickness as it can be determined by optical or electronic microscopy of less than 0.4 mm, more preferably between 0.05 and 0.2 mm. It is not necessary that the film-like plastomer layer be continuous, however it is preferred that the film-like plastomer layer is continuous since such a film-like layer protects the woven fabric from potentially harmful external factors. It was observed that the flexible sheet according to this embodiment shows also a further reduced shrinkage.

Figure 2:
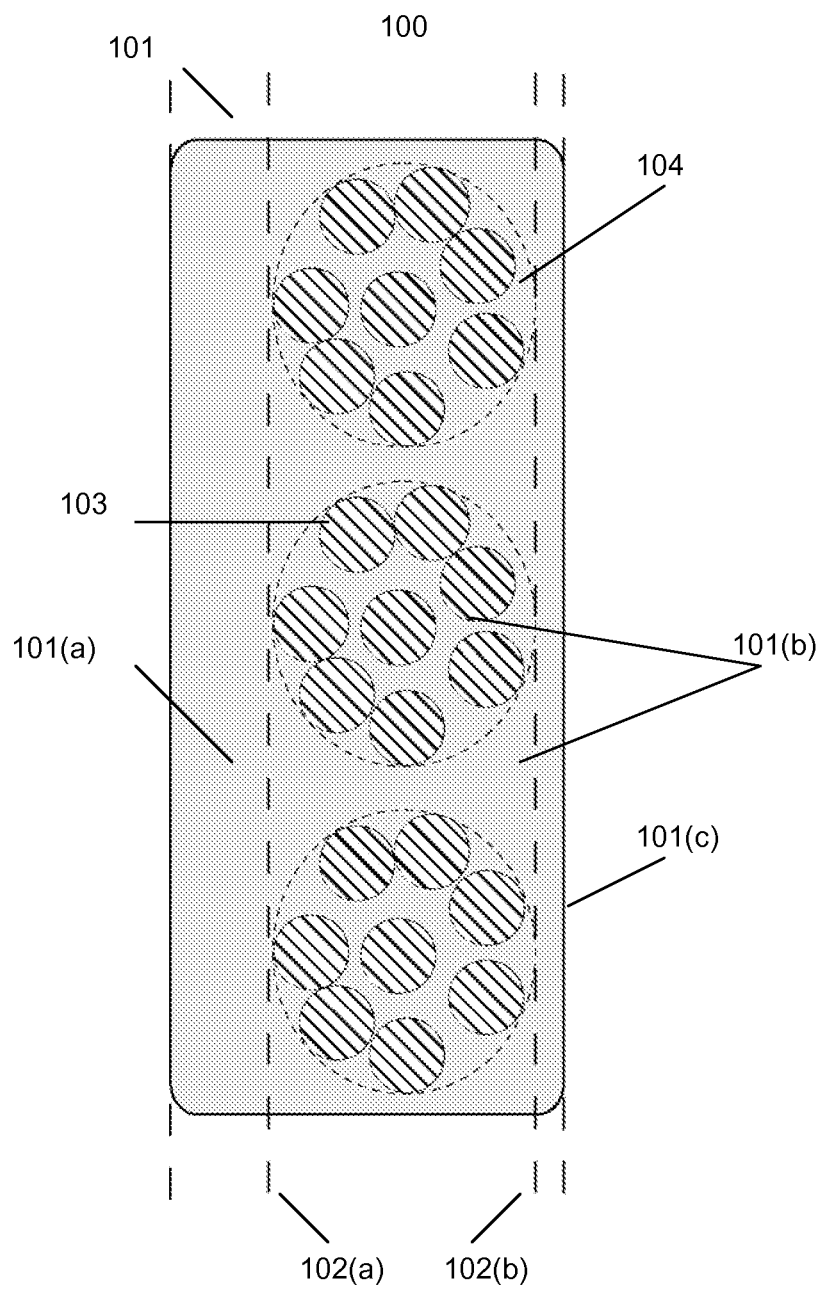
FIG. 2 is a cross-sectional view of a flexible sheet encapsulated by the plastomer.

Referring to FIG. 2, the second part (101b) of the plastomer layer (101) is impregnated into the woven fabric between the yarns (103) and the fibers (104) thereof and extends all the way between the upper (102a) and lower (102b) surfaces of said fabric. The second part (101b) of the plastomer layer (101) is also cohesively connected to the first part (101a) and to a third part (101c) of the plastomer layer (101), said first and third part being adhered to and covering the upper (102a) and lower (102b) surfaces of the woven fabric, respectively, and encapsulating said fabric.

It is not necessary that the second part (101b) fully impregnates the woven fabric. It is preferred however, that the total volume of voids (107) and/or air pockets, i.e. the sum of the volumes of individual voids, present in said flexible sheet is less than 50% of the volume of the flexible sheet, more preferably less than 30%, most preferably less than 10%.

The plastomer contained by the flexible sheet of the invention is a plastic material that belongs to the class of thermoplastic materials. According to the invention, said plastomer is a semi-crystalline copolymer of ethylene or propylene and one or more C2 to C12 α-olefin co-monomers, said plastomer having a density of between 880 and 930 kg/m$^3$. It was observed that the flexible sheet of the invention showed a good shrinkage resistance when the plastomer was manufactured by a single site catalyst polymerization process, preferably said plastomer being a metallocene plastomer, i.e. a plastomer manufactured by a metallocene single site catalyst. Ethylene is in particular the preferred co-monomer in copolymers of propylene while butene, hexene and octene are being among the preferred α-olefin co-monomers for both ethylene and propylene copolymers.

In a preferred embodiment, the plastomer is a thermoplastic copolymer of ethylene or propylene and containing as co-monomers one or more α-olefins having 2-12 C-atoms, in particular ethylene, isobutene, 1-butene, 1-hexene, 4-methyl-1-pentene and 1-octene. When ethylene with one or more C3-C12 α-olefin monomers as co-monomers is applied, the amount of co-monomer in the copolymer usually is lying between 1 en 50 wt. %, and preferably between 5 and 35 wt. %. In case of ethylene copolymers, the preferred co-monomer is 1-octene, said co-monomer being in an amount of between 5 wt % and 25 wt %, more preferably between 15 wt % and 20 wt %. In case of propylene copolymers, the amount of co-monomers and in particular of ethylene co-monomers, usually is lying between 1 en 50 wt. %, and preferably between 2 and 35 wt %, more preferably between 5 and 20 wt. %. Good results in terms of shrinkage were obtained when the density of the plastomer is between 880 and 920 kg/m$^3$, more preferably between 880 and 910 kg/m$^3$.

Other plastomers suitable for use in accordance with the invention are those described in JP 11 138715; JP 11 291419; JP 2000 233477 and U.S. Pat. No. 5,994,242 (columns 2-4), incorporated herein by reference.

Better resistance to shrinkage was obtained when the plastomer used according to the invention has a DSC peak melting point as measured according to ASTM D3418 of between 70° C. and 120° C., preferably between 75° C. and 100° C., more preferably between 80° C. and 95° C.

A plastomer manufactured by a single site catalyst polymerization process and in particular a metallocene plastomer is distinguished from ethylene and propylene copolymers that have been manufactured with other polymerization techniques, e.g. Ziegler-Natta catalysation, by its specific density. Said plastomer also differentiates itself by a narrow molecular weight distribution, Mw/Mn, the values thereof preferably being between 1.5 en 3 and by a limited amount of long chain branching. The number of long chain branches preferably amounts at most 3 per 1000 C-atoms. Suitable plastomers that may be used in the flexible sheet of the invention and obtained with the metallocene catalyst type are manufactured on a commercial scale, e.g by Exxon, Mitsui, DEX-Plastomers and DOW under brand names as Exact, Tafmer, Exceed, Engage, Affinity, Vistamaxx and Versify. A description of plastomers and in particular of metallocene plastomers as well as an overview of their mechanical and physical properties can be found for instance in Chapter 7.2 of "*Handbook of polypropylene and polypropylene composites*" edited by Harutun G. Karian (ISBN 0-8247-4064-5) and more in particular in subchapters 7.2.1; 7.2.2; and 7.2.5 to 7.2.7 thereof, which are included herein by reference.

As mentioned hereinbefore, the plastomer layer used in the flexible sheet of the invention may also contain various fillers and additives added thereof. Examples of fillers include reinforcing and non-reinforcing materials, e.g. carbon black, calcium carbonate, clay, silica, mica, talc, and glass. Examples of additives include stabilizers, e.g. UV stabilizers, pigments, antioxidants, flame retardants and the like. Preferred flame retardants include aluminum tryhidrate, magnesium dehydrate and ammonium phosphate. The amount of flame retardants is preferably from 1 to 60, more preferably from 1 to 10 by weight percent of the amount of plastomer in the flexible sheet of the invention. Most preferred flame retardant is ammonium phosphate, e.g. Exolit.

Good shrinkage resistance was obtained when the amount of plastomer was chosen to yield a flexible sheet having an areal density (AD) that is with at least 20%, more preferably with at least 50%, even more preferably with at least 75%, most preferably with at least 100%, higher than the AD of the woven fabric utilized thereof. Preferably the flexible sheet has an areal density (AD) that is with at most 500%, more preferably at most 400%, most preferably at most 300% higher than the AD of the woven fabric utilized thereof. Good results were obtained when the plastomer encapsulates the woven fabric and the amount of plastomer was chosen as indicated hereinabove. AD is expressed in kg/m$^2$ and is obtained by weighing a certain area, e.g. 0.01 m$^2$ and dividing the obtained mass by the area of the sample.

By fiber is herein understood a continuous elongated body having a length dimension much greater that the fiber's transverse dimensions, e.g. of width and thickness. The term fiber also includes various embodiments e.g. a filament, a ribbon, a strip, a band, a tape and the like having regular or irregular cross-sections. A yarn for the purpose of the invention is an elongated body containing a plurality of fibers.

Preferred polyethylene fibers are high molecular weight polyethylene (HMWPE) fibers. More preferred polyethylene fibers are ultrahigh molecular weight polyethylene (UHMWPE) fibers as it was observed that when such fibers were used the flexible sheet of the invention had a low shrinkage. Said polyethylene fibers may be manufactured by any technique known in the art, preferably by a melt or a gel spinning process. Most preferred fibers are gel spun UHMWPE fibers, e.g. those sold by DSM Dyneema under the name Dyneema® as it was observed that when such fibers were used the flexible sheet of the invention had the lowest shrinkage. If a melt spinning process is used, the polyethylene starting material used for manufacturing thereof preferably has a weight-average molecular weight between 20,000 and 600,000 g/mol, more preferably between 60,000 and 200,000 g/mol. An example of a melt spinning process is disclosed in EP 1,350,868 incorporated herein by reference. If the gel spinning process is used to manufacture said fibers, preferably an UHMWPE is used with an intrinsic viscosity (IV) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fibre Spinning Technology*", Ed. T. Nakajima, Woodhead Publ. Ltd (1994), ISBN 185573 182 7.

Other yarns of fibers that may be used in combination with the yarns containing polyethylene fibers to construct the woven fabric include but are not limited to yarns of fibers manufactured from polyamides and polyaramides, e.g. poly (p-phenylene terephthalamide) (known as Kevlar®); poly (tetrafluoroethylene) (PTFE); poly{2,6-diimidazo-[4,5b-4', 5'e]pyridinylene-1,4(2,5-dihydroxy)phenylene} (known as M5); poly(p-phenylene-2, 6-benzobisoxazole) (PBO) (known as Zylon®); poly(hexamethyleneadipamide) (known as nylon 6,6), poly(4-aminobutyric acid) (known as nylon 6); polyesters, e.g. poly(ethylene terephthalate), poly (butylene terephthalate), and poly(1,4 cyclohexylidene dimethylene terephthalate); polyvinyl alcohols; thermotropic liquid crystal polymers (LCP) as known from e.g. U.S. Pat. No. 4,384,016; but also polyolefins other than polyethylene e.g. homopolymers and copolymers of polypropylene. Also yarns containing combinations of fibers manufactured from the above referred polymers can be used to manufacture the woven fabric contained in the inventive flexible sheet. Preferred other yarns however are those containing fibers of polyamide and/or LCP.

In a special embodiment of the invention, the fiber is a UHMWPE tape. A tape (or a flat tape) for the purposes of the present invention is a fiber with the cross sectional aspect ratio of at least 5:1, more preferably at least 20:1, even more preferably at least 100:1 and yet even more preferably at least 1000:1. The width of the flat tape is preferably between 1 mm and 600 mm, more preferable between 1.5 mm and 400 mm, even more preferably between 2 mm and 300 mm, yet even more preferably between 5 mm and 200 mm and most preferably between 10 mm and 180 mm. Thickness of the flat tape preferably is between 10 µm and 200 µm and more preferably between 15 µm and 100 µm.

Preferably, the fibers employed by the invention have deniers in the range of from 0.5 to 20 dpf, more preferably from 0.7 to 10 dpf, most preferably from 1 to 5 dpf. The yarns containing said fibers preferably have deniers in the range of from 100 to 3000 dtex, more preferably from 200 to 2500 dtex, most preferably from 400 to 1000 dtex.

The tensile strength of the polyethylene fibers utilized in the present invention as measured according to ASTM D2256 is preferably at least 1.2 GPa, more preferably at least 2.5 GPa, most preferably at least 3.5 GPa. A flexible sheet of the invention utilizing a fabric manufactured from such strong polyethylene fibers is lighter in weight and stronger than any other flexible sheet having the same construction which utilizes fabrics manufactured from e.g. polyester, nylon, aramid or glass fibers as well as having a low shrinkage. The tensile modulus of the polyethylene fibers as measured according to ASTM D2256 is preferably at least 30 GPa, more preferably at least 50 GPa, most preferably at least 60 GPa.

In a preferred embodiment of the invention, at least 80 mass %, more preferably at least 90 mass %, most preferably 100 mass % of the yarns used to manufacture the woven fabric utilized in the flexible sheet of the invention are yarns containing polyethylene fibers, more preferably are yarns containing only polyethylene fibers, even more preferably, containing only UHMWPE fibers, most preferably containing only gel spun UHMWPE fibers. By yarns containing e.g. only polyethylene fibers, is herein understood that all the fibers in the yarn are made of polyethylene. The remaining mass % of yarns may consist of yarns containing other fibers as enumerated hereinabove. It was observed that by using woven fabrics containing an increased mass % of polyethylene yarns and in particular fabrics wherein the fibers in all yarns are polyethylene fibers, the flexible sheet of the invention showed in addition to reduced shrinkage, a good resistance to sun light and UV degradation, high tear strength and low weight.

Preferred embodiments of woven fabrics suitable for manufacturing the flexible sheet of the invention include plain (tabby) weaves, basket weaves, crow feet weaves and satin weaves although more elaborate weaves such as triaxial weaves may also be used. More preferably the woven fabric is a plain weave, most preferably, the woven fabric is a basket weave. Preferably, the fibers contained by the yarns used to manufacture the woven fabric are fibers having a rounded cross-section, said cross section having an aspect ratio of at most 4:1, more preferably at most 2:1.

Preferred woven fabrics for use according to the invention are fabrics having a cover factor of at least 1.5, more preferably at least 2, most preferably at least 3. Preferably, said cover factor is at most 30, more preferably at most 20, most preferably at most 10. It was observed that the use of such fabrics leads to a flexible sheet having reduced shrinkage. Moreover, it was observed that an optimum impregnation of the woven fabric was achieved, minimizing therefore the amount of voids or air pockets contained by the flexible sheet. It was also observed that a low amount of voids or air pockets in the flexible sheet of the invention contributes to an improved dimensional stability of said sheet. It was furthermore observed that a more homogeneous flexible sheet is obtained, i.e. a flexible sheet having less local variations of its mechanical properties. The impregnation can be carried out for example by forcing under pressure a molten plastomer through said fiber and/or yarns.

The invention further relates to a method for manufacturing the flexible sheet of the invention comprising the steps of:

a) providing a woven fabric preferably as defined hereinabove and a plastomer, said woven fabric comprising yarns containing polyethylene fibers and wherein said plastomer is a semi-crystalline copolymer of ethylene or propylene and one or more C2 to C12 α-olefin co-monomers and wherein said plastomer has a density as measured according to ISO1183 of between 870 and 930 kg/m³;
b) melting the plastomer at a temperature above its melting temperature and preferably of at most 180° C., more preferably of at most 165° C.;
c) depositing the molten plastomer on at least one surface of said woven fabric, preferably on both surfaces of the woven fabric, to form a woven fabric containing a molten plastomer layer deposited on at least one surface of said woven fabric;
d) applying a pressure of at least 20 bar on the woven fabric of step c) at a temperature of between the melting temperature of the plastomer and the melting temperature as determined by DSC of the polyethylene fibers to obtain a compressed woven fabric.
e) cooling to room temperature the compressed woven fabric of step d) after a dwell time.

Preferably, at step d) of the process of the invention, part of said molten plastomer is impregnated into said woven fabric by forcing under pressure, also referred to as impregnation pressure, and at an elevated temperature, also referred to as impregnation temperature, said molten plastomer throughout said fabric between the yarns and/or the fibers thereof.

Preferably, the pressure or the impregnation pressure at step d) of the process of the invention is at least 30 bars, more preferable at least 40 bars, even more preferably 60 bars, most preferably at least 80 bars. Good results in terms of shrinkage resistance are obtained when the pressure is applied in a raising ramp of at least 0.5 bars/sec, more preferably of at least 1.2 bars/sec, most preferably of at least 2 bars/sec. Preferably, the pressure is applied in a raising ramp of at most 15 bars/sec, more preferably of at most 12 bars/sec, most preferably of at most 10 bars/sec. The pressure can be applied with conventional pressing means, e.g. a WN Anlagepress.

The temperature used at step d) of the process of the invention is between the melting temperature of the plastomer and the melting temperature as determined by DSC of the polyethylene fibers, preferably between 90° C. and 150° C., more preferably between 100° C. and 120° C. Preferably, when a woven fabric comprising yarns containing UHM-WPE fibers is used, said temperature is between 90° C. and 145° C., more preferably between 100° C. and 130° C. It was observed that by choosing the pressure and the temperature within the above mentioned preferred ranges, the part of the plastomer that is impregnated into the woven fabric is forced between the yarns but also between the fibers of the yarns such that a flexible sheet with a low shrinkage is obtained. Furthermore, the total volume of voids was reduced below 10% of the volume of the flexible sheet of the invention.

The flexible sheet of the invention may also be manufactured by a method comprising:
i. depositing the plastomer defined hereinabove on at least one surface, preferably on both surfaces of the woven fabric, said fabric comprising yarns containing polyethylene fibers;
ii. melting the plastomer at a temperature above its melting temperature and preferably of at most 180° C., more preferably of at most 165° C.; and
iii. impregnating at least part of said molten plastomer into said fabric by forcing under an impregnation pressure and at an elevated impregnation temperature said molten plastomer throughout said fabric between the yarns and/or the fibers thereof.

Preferably, at step i.) the plastomer is deposited by laying a preformed film of said plastomer on at least one, more preferably on both surfaces of the fabric. The impregnation pressure applied during the impregnation step iii.) should be at least 20 bars, more preferably at least 30 bars, most preferable at least 40 bars. The pressure can be applied with conventional pressing means that can be heated as well, e.g. a WN Anlagepress. Good results in terms of shrinkage resistance are obtained when the pressure is applied in a raising ramp of at least 0.5 bars/sec, more preferably of at least 1.2 bars/sec, most preferably of at least 2 bars/sec. Preferably, the pressure is applied in a raising ramp of at most 15 bars/sec, more preferably of at most 12 bars/sec, most preferably of at most 10 bars/sec. The impregnation temperature of the molten plastomer during step iii.) is preferably between the melting temperature of the plastomer and the melting temperature as determined by DSC of the polyethylene fibers, preferably between 90° C. and 150° C., more preferably between 100° C. and 120° C. Preferably, when a woven fabric comprising yarns containing UHM-WPE fibers is used, the impregnation temperature is between 90° C. and 145° C., more preferably between 100° C. and 130° C. It was observed that by choosing the pressure and the temperature within the above mentioned preferred ranges, the part of the plastomer that is impregnated into the woven fabric is forced between the yarns but also between the fibers of the yarns such that a flexible sheet with a lower shrinkage is obtained. Furthermore, the total volume of voids was reduced below 10% of the volume of the flexible sheet of the invention.

The flexible sheet of the invention may also be manufactured by a method comprising:
1. depositing a molten plastomer layer on at least one surface of the woven fabric to form a sheet having a thickness approximately equal with the sum of the thicknesses of said molten plastomer layer and of said fabric; and
2. impregnating said fabric with part of the molten plastomer layer by drawing the sheet into a gap between two calendaring rollers at a temperature of between the melting temperature of the plastomer and the melting temperature as determined by DSC of the polyethylene fibers, preferably of between 90° C. and 150° C., more preferably between 100° C. and 120° C., said gap having a width smaller than the thickness of the sheet, wherein the gap is adjusted such that a pressure of at least 20 bars, preferably at least 30 bars, more preferably of at least 40 bars, even more preferably of at least 50 bars, most preferably of at least 80 bars is applied on said sheet by the calendaring rolls.

The skilled person can routinely adjust the pressure at step 2 above by adjusting the gap between the calendaring rolls. A smaller gap means a higher pressure.

At step 1 the plastomer is molten at a temperature above its melting temperature and preferably of at most 180° C., more preferably of at most 165° C. Preferably at step 2, when using a woven fabric comprising yarns containing UHMWPE fibers, the temperature used therein is between 90° C. and 145° C., more preferably between 100° C. and 130° C. The method according to this further preferred embodiment may be repeated in order to deposit a plastomer layer on both surfaces of the woven fabric such that a woven fabric encapsulated in the plastomer is obtained.

Preferably, in the processes of the invention the woven fabric is preheated before depositing the plastomer thereon. It was observed that for a preheated fabric, the shrinkage is reduced and also the homogeneity of the flexible sheet of the invention is increased. Preferably, the woven fabric is preheated to a temperature of between 50° C. and 130° C., more preferably to a temperature of between 80° C. and 100° C. The preheating of the woven fabric can be carried out by using infrared radiation (IR) or a stream of hot air.

Melting the plastomer in the processes of the invention can be carried out according to known methods in the art, e.g. in an oven. Preferably, the plastomer is molten at a temperature of between 120° C. and 150° C., more preferably of between 130° C. and 145° C. It was observed that when using such temperatures for melting the plastomer, a better impregnation of the woven fabric was obtained and the obtained flexible sheet showed a reduced shrinkage. It was also observed that the total volume of voids in the flexible sheet of the invention is further reduced.

After the impregnation, the flexible sheet is cooled in a cooling step, e.g. with a stream of cold air, to a temperature below 50° C., more preferably to a temperature of between 10° C. and 30° C.

Preferably, the thickness of the flexible sheet of the invention is at least 0.1 mm, more preferably at least 0.5 mm, most preferably at least 1 mm. Preferably, the thickness of the flexible sheet of the invention is between 0.2 mm and 5 mm, more preferably between 0.3 mm and 3 mm. The thickness of said flexible sheet is dependent upon the nature of the woven fabric in relation to the weave and the thickness, the quantity of plastomer layer and to the force or pressure used to impregnate the plastomer into said fabric through the interstices thereof. The AD of said flexible sheet is preferably between 0.2 and 3 kg/m$^2$, more preferably between 0.2 and 2 kg/m$^2$.

When the flexible sheet of the invention comprises a woven fabric which is encapsulated in the plastomer layer, said fabric can be positioned in the center of said sheet or off center. Good results in terms of shrinkage were obtained when the woven fabric was positioned as close as possible to the center of the flexible sheet of the invention.

As detailed hereinabove, in some preferred embodiments, the flexible sheet of the invention comprises a plastomer layer containing a first part, a second part and a third part. Preferably the AD of the first part of the plastomer layer is at most 20% higher, more preferably at most 10% higher, most preferably at most 5% higher than the AD of the third part of the plastomer layer. The thickness or the AD of said first and third parts of the plastomer layer can be for example varied by depositing a different amount of plastomer on each of the surfaces of the woven fabric prior to impregnation.

It was observed that the best results in terms of shrinkage were obtained for large sized flexible sheets. By large sized flexible sheets is herein understood sheets wherein the largest distance between two imaginary points on the perimeter of said sheet of at least 30 mm, more preferably at least 60 mm, most preferably of at least 100 mm. For a rectangular shaped sheet, good results in terms of shrinkage were obtained when the lateral dimensions of width and length thereof were at least 50 mm, more preferably at least 75 mm, most preferably at least 100 mm.

The present invention also relates to a flexible sheet obtainable by any of the above presented methods, said sheet comprising a woven fabric, said fabric comprising yarns containing polyethylene fibers, and furthermore, said sheet comprising a plastomer as defined hereinabove, wherein said sheet has a total shrinkage of at most 1.9%, preferably of at most 1.8%, more preferably at most 1.7%, even more preferably at most 1.6%, yet more preferably of at most 1.5%, yet more preferably of at most 1.2%, yet more preferably of at most 1.0%, yet more preferably of at most 0.8%, yet more preferably of at most 0.6%, yet more preferably of at most 0.45%.

The present invention also relates to various products containing the flexible sheet of the invention. Examples of products include but are not limited to cargo and container covers, ground covers, roofing, and building covers, reservoir, pond, canal, and pit liners, sails, tarpaulins, awnings, sails, bags, inflated structures, tents and the like.

The most important benefit provided by the flexible sheet of the invention to all of the above products is dimensional stability which reduces the maintenance and the time and costs associated thereof for products designed in particular for long term applications.

In particular the invention relates to a curtain or a closure for open end cargo containers containing the flexible sheet of the invention. Cargo containers of many forms have been used for transporting land, sea, and air cargo for many years. One type of cargo container is box-like, with at least two side walls, a top, and a flat bottom. Typically, one end of the cargo container is open for loading and unloading cargo. It was observed that a door closures according to the invention successfully prevents the cargo from being exposed to dirt, moisture, and ultraviolet light while being lightweight and having high strength.

The invention also relates to a roofing sheeting containing the flexible sheet of the invention. Generally, roofing sheeting is used for covering industrial and commercial roofs. The flexible sheet of the invention proved very suitable for this application due to its outstanding weather resistance, flexibility, lightweight and strength.

Methods of Measurement

IV: the Intrinsic Viscosity of UHMWPE is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration.

Cover factor: of a woven fabric is calculated by multiplying the average number of individual weaving yarns per centimeter in the warp and the weft direction with the square root of the linear density of the individual weaving yarns (in tex) and dividing by 10.

An individual weaving yarn may contain a single yarn as produced, or it may contain a plurality of yarns as produced said yarns being assembled into the individual weaving yarn prior to the weaving process. In the latter case, the linear density of the individual weaving yarn is the sum of the linear densities of the as produced yarns. The cover factor (CF) can be thus computed according to formula:

$$CF = \frac{m}{10}\sqrt{pt} = \frac{m}{10}\sqrt{T}$$

wherein m is the average number of individual weaving yarns per centimeter, p is the number of as produced yarns assembled into a weaving yarn, t is the linear density of the yarn as produced (in tex) and T is the linear density of the individual weaving yarn (in tex).

Dtex: of a fiber was measured by weighing 100 meters of fiber. The dtex of the fiber was calculated by dividing the weight in milligrams by 10.

Total volume of voids $V_{voids}$ in %: contained by a flexible sheet is calculated according to formula:

$$V_{voids}[\%] = \frac{T_{sheet} - \frac{AD_{fabric}}{\rho_{fiber}} - \frac{AD_{coating}}{\rho_{coating}}}{T_{sheet}} \times 100$$

wherein $T_{sheet}$ is the thickness of the flexible sheet; $AD_{fabric}$ and $AD_{coating}$ are the areal densities of the flexible sheet and the coating, respectively; and $\rho_{fiber}$ and $\rho_{coating}$ are the densities of the polyethylene fiber and the coating, respectively. The density $\rho_{fiber}$ of the fiber is determined in accordance with ASTM D1505-03.

Thickness: of a woven fabric or of a flexible sheet was determined by measuring 10 times the distance between the surfaces thereof at different locations and averaging the results. Care was taken not to deform the sample during measurements.

Shrinkage: a square sample of 0.4 m length and 0.4 m width, was placed in the drum of a laundry machine and rotated in the absence of water at a rotating speed of 60 rot/min for 72 hours at a temperature of about 23° C. and humidity of about 65% together with a number of 5 clay balls. Each clay ball had a mass of 0.22 Kg and a diameter of about 50 mm, the surface of each ball being covered with a cotton fabric by placing the ball in a cotton bag which tightly accommodates the ball. The dimensions of the sample were measured before and after the treatment and the difference thereof (expressed in %) was considered representative for the shrinkage of the sample.

EXAMPLES AND COMPARATIVE EXPERIMENTS

Example 1

A basket woven fabric 250 mm/250 mm and having an AD of about 0.193 kg/m², a cover factor of about 5 and a thickness of about 0.6 mm was made from 880 dtex polyethylene yarns known as Dyneema® SK 65.

The fabric was preheated at a temperature of about 90° C.

Two 50 μm Exact® 0203 plastomer preformed films, also referred to as foils, of 250 mm/250 mm were placed on both sides of the preheated woven fabric to cover the surface of said fabric substantially in its entirety. Exact® 0203 is a plastomer from DexPlastomers and is an ethylene based octane plastomer with about 18% octane, a density of 902 kg/m³ and a DSC peak melting point of 95° C.

The woven fabric was then pressed together with the plastomer foils for about two seconds in a commercially available (WN Anlagepress) heated press at 50 bars, a pressure raising ramp of about 2 bars/sec and at 100° C. A flexible sheet having less than 10% voids and containing the woven fabric encapsulated by the plastomer was obtained. The shrinkage of the sample was measured, the results being shown in Table.

Example 2

Example 1 was repeated with the difference that the thickness of the Exact® 0203 plastomer foils was 100 μm.

Example 3

Example 1 was repeated with the difference that the temperature during pressing was 120° C.

Example 4

Example 3 was repeated with the difference that the thickness of the Exact® 0203 plastomer foils was 100 μm.

Comparative Experiment A-C

The fabric of Example 1 was impregnated with in one experiment (A) with neoprene rubber and in another (B) with polyurethane (from Barrday Inc, Canada) by a dipcoating process. The rubber was subsequently cured.

In a third experiment (C), a polyethylene fabric was covered with EVA according to the method described in Example 2 of U.S. Pat. No. 6,280,546.

| Sample | Shrinkage in warp direction (%) | Shrinkage in weft direction (%) | Total shrinkage (%) |
|---|---|---|---|
| Example 1 | 0.9 | 1.5 | 1.2 |
| Example 2 | 0.5 | 0.5 | 0.5 |
| Example 3 | 0.9 | 1.5 | 1.2 |
| Example 4 | 0.9 | 0.9 | 0.9 |
| Comp. Exp. A | 3.10 | 1.30 | 2.20 |
| Comp. Exp. B | 5.00 | 3.95 | 4.47 |
| Comp. Exp. C | 1.60 | 2.25 | 1.92 |
| Uncoated fabric of polyethylene | 21.00 | 34.00 | 27.5 |

From the above examples and comparative experiments it can be observed that the flexible sheet of the invention shows a largely reduced shrinkage when compared to known fabrics or fabrics made in accordance with processes disclosed in various publications.

The invention claimed is:

1. A flexible sheet comprising:
(i) a woven fabric comprising yarns containing gel-spun ultrahigh molecular weight polyethylene (UHMWPE) fibers; and
(ii) a plastomer layer which comprises a plastomer, wherein
the woven fabric has a cover factor (CF) of at least 1.5 and at most 30 computed by the formula:

$$CF = \frac{m}{10}\sqrt{pt} = \frac{m}{10}\sqrt{T}$$

where
m is the average number of individual weaving yarns per centimeter,
p is the number of as produced yarns assembled into a weaving yarn,
t is the linear density in tex of the yarn as produced, and
T is the linear density in tex of the individual weaving yarn; and wherein
the plastomer layer has a first part adhered to at least one surface of said woven fabric, and a second part impregnated between the yarns and/or fibers of the fabric, the second part of the plastomer layer extending throughout the fabric and being cohesively connected to the first part thereof; and wherein
the plastomer is a semi-crystalline copolymer of ethylene or propylene and one or more C2 to C12 α-olefin co-monomers and wherein said plastomer has a density as measured according to ISO1183 of between 870 and 930 kg/m³; and wherein the plastomer is present in an amount to achieve an areal density (AD) of the flexible sheet which is at least 20% higher than the AD of the woven fabric; and wherein the flexible sheet has a total shrinkage of at most 1.9%.

2. A flexible sheet according to claim 1, wherein the woven fabric has an upper surface and a lower surface, and wherein the first part of the plastomer layer is present on the upper surface and the lower surface thereby encapsulating the fabric.

3. A flexible sheet according to claim 1, wherein the flexible sheet has a total shrinkage of at most 1.5%.

4. A flexible sheet according to claim 1, consisting of the woven fabric, the plastomer layer and optionally various fillers and additives added to the plastomer.

5. A flexible sheet according to claim 1, wherein the flexible sheet has a total volume of voids present in the flexible sheet of less than 50% of the volume of the sheet.

6. A flexible sheet according to claim 1, wherein the plastomer is a thermoplastic copolymer of ethylene or propylene containing as co-monomers one or more α-olefins having 2-12 C-atoms.

7. A flexible sheet according to claim 1, wherein the plastomer has a density of between 880 and 910 kg/m$^3$.

8. A flexible sheet according to claim 1, wherein the plastomer has peak melting point of between 70° C. and 120° C.

9. A flexible sheet according to claim 1, wherein the fibers have a denier between 0.5 and 20 dpf.

10. A flexible sheet according to claim 1, wherein the woven fabric is chosen from the group consisting of plain (tabby) weaves, basket weaves, crow feet weaves, satin weaves and triaxial weaves.

11. A flexible sheet according to claim 3, wherein the total shrinkage of the flexible sheet is at most 1%.

12. A flexible sheet according to claim 3, wherein the total shrinkage of the flexible sheet is at most 0.6%.

13. A product comprising the flexible sheet according to claim 1, wherein the product is selected from the group consisting of cargo and container covers, ground covers, roofing, and building covers, reservoir, pond, canal, and pit liners, sails, tarpaulins, awnings, sails, bags, inflated structures and tents.

14. A flexible sheet comprising:
(i) a woven fabric comprising yarns containing gel-spun ultrahigh molecular weight polyethylene (UHMWPE) fibers having a rounded cross-section with an aspect ratio of at most 4:1; and
(ii) a plastomer layer which comprises a plastomer, wherein
the woven fabric has a cover factor (CF) of at least 1.5 and at most 30 computed by the formula:

$$CF = \frac{m}{10}\sqrt{pt} = \frac{m}{10}\sqrt{T}$$

where
m is the average number of individual weaving yarns per centimeter,
p is the number of as produced yarns assembled into a weaving yarn,
t is the linear density in tex of the yarn as produced, and
T is the linear density in tex of the individual weaving yarn; and wherein
the plastomer layer has a first part adhered to at least one surface of said woven fabric, and a second part impregnated between the yarns and/or fibers of the fabric, the second part of the plastomer layer extending throughout the fabric and being cohesively connected to the first part thereof; and wherein
the plastomer is a semi-crystalline copolymer of ethylene or propylene and one or more C2 to C12 α-olefin co-monomers and wherein said plastomer has a density as measured according to ISO1183 of between 870 and 930 kg/m$^3$; and wherein
the plastomer is present in an amount to achieve an areal density (AD) of the flexible sheet which is at least 20% higher than the AD of the woven fabric; and wherein
the flexible sheet has a total shrinkage of at most 1.9%.

15. The flexible sheet according to claim 14, wherein the gel-spun UHMWPE fibers have a rounded cross-section with an aspect ratio of at most 2:1.

* * * * *